June 6, 1967  E. J. VOITAS  3,323,554
TUBES AND METHOD OF TUBE MANUFACTURE
Filed April 1, 1964  2 Sheets-Sheet 1
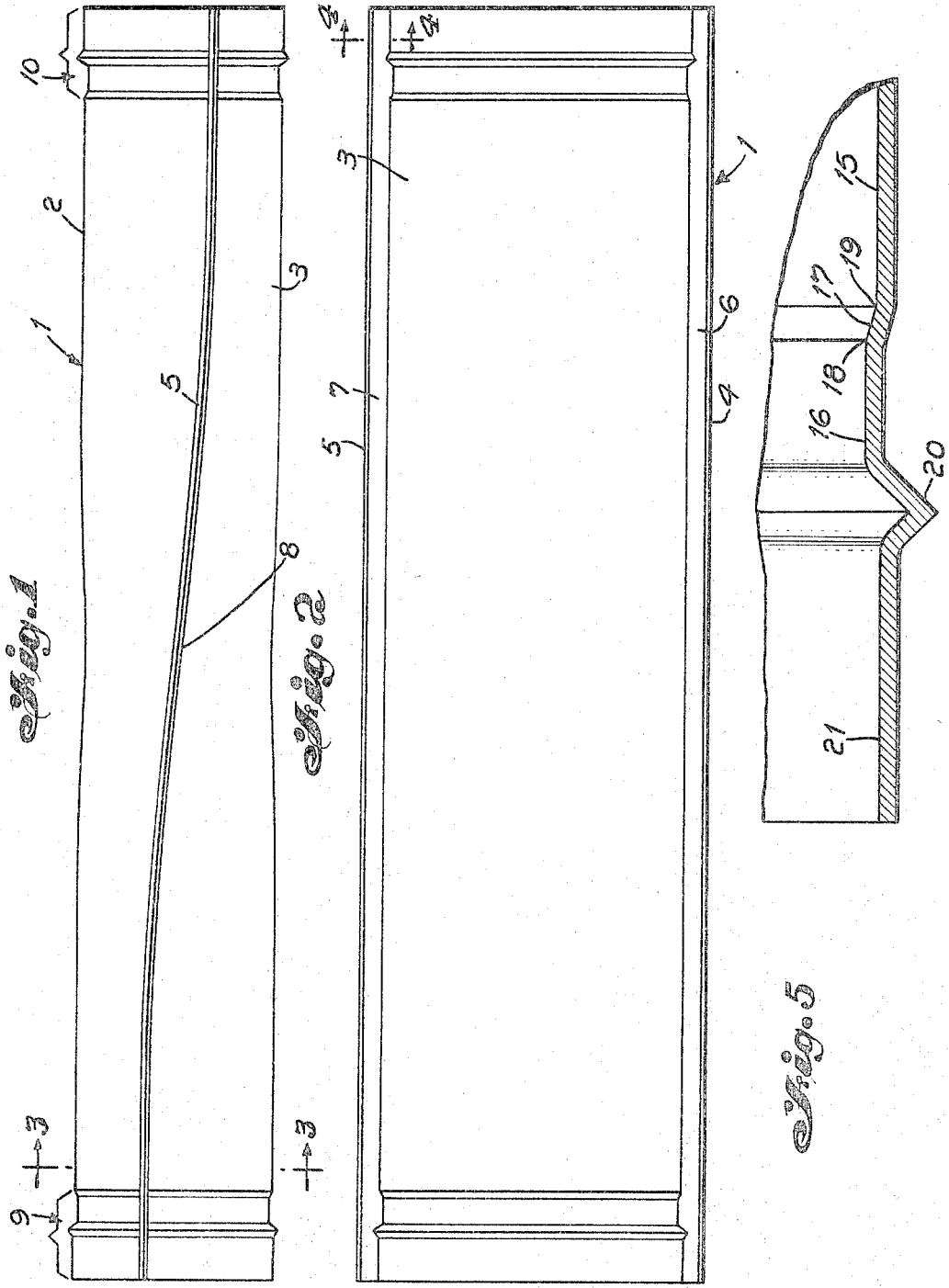
INVENTOR.
EDWARD J. VOITAS
BY Joseph Littenberg
AGENT

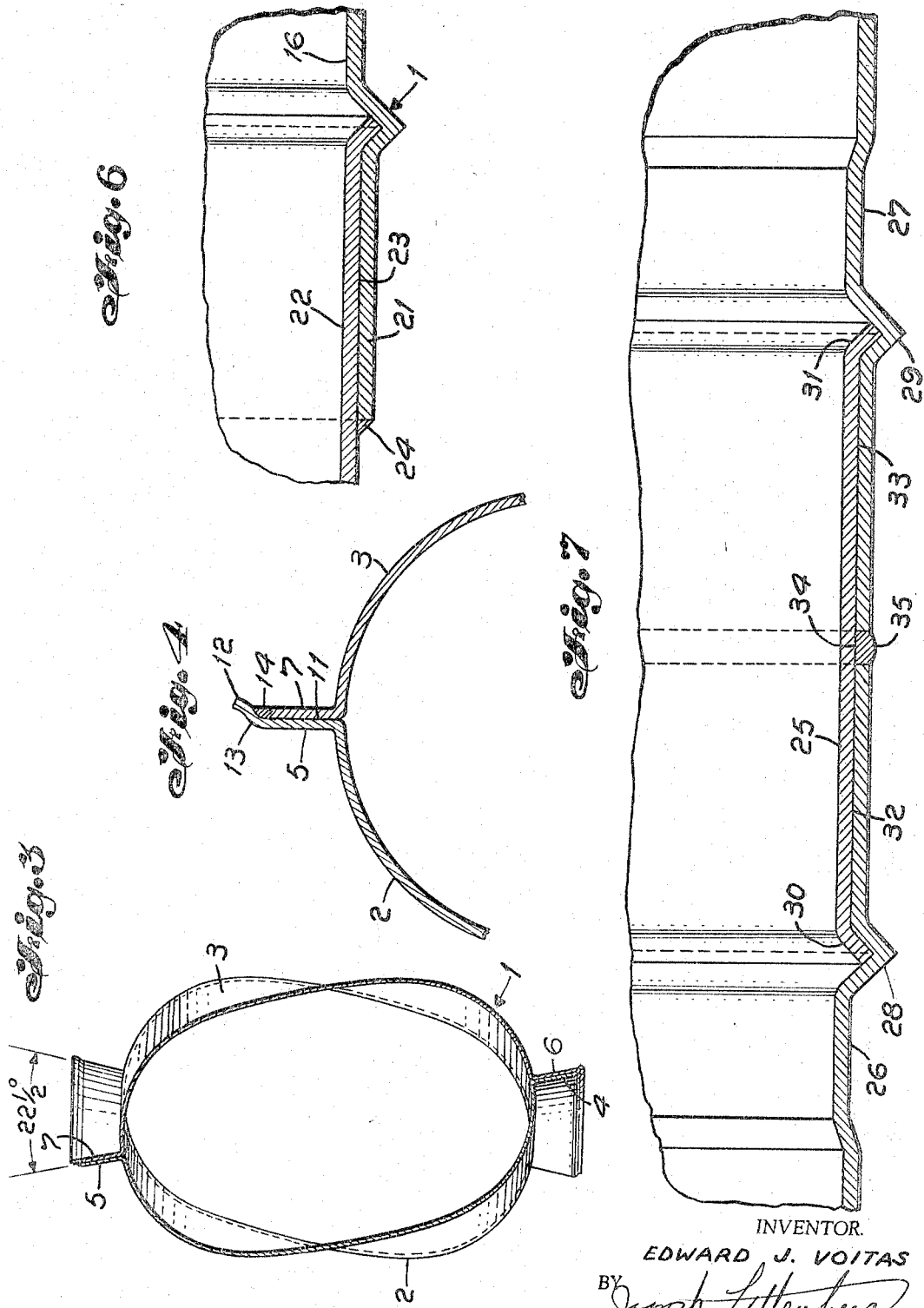

United States Patent Office 3,323,554
Patented June 6, 1967

3,323,554
TUBES AND METHOD OF TUBE MANUFACTURE
Edward J. Voitas, Oakland, N.J., assignor to International Telephone and Telegraph Corporation, Nutley, N.J., a corporation of Maryland
Filed Apr. 1, 1964, Ser. No. 356,498
3 Claims. (Cl. 138—157)

This invention relates to tubes and a method of manufacturing tubes, and more particularly to a twist and a method for manufacturing a twist in a pneumatic forwarding tube.

The term "twist" as applied to a tube refers to a section of the tube along which the cross-section of the tube is radially rotated about the longitudinal axis of the tube. Carriers used in non-circular cross-sectioned pneumatic tube systems are normally transported on edge. For instance, in an oval pneumatic tube system, the major axis of the oval is vertical during transport. This can be seen in many pneumatic tube overhead systems where the carriers are transported on edge along the ceiling of the buildings in which they are installed. The carriers then must be transported down to their various destinations or stations inside the walls of the buildings. It is often required that the major axis of the carriers be parallel to the wall surface or the bulk of the pneumatic station will protrude beyond the walls. A 90° turn of the carriers may be needed to position the carriers thusly. A twist also may be used when moving a carrier into an exchange station of a pneumatic tube system such as is disclosed in U.S. Patent 2,052,597 or between stations in a pneumatic tube drive-in service apparatus of the type disclosed in U.S. Patent No. 2,912,066.

The provision of a twist in a pneumatic tube for effecting a radial turn of the carriers is known. Present twists, however, are undesirable due to their inability to maintain a true cross-section throughout the length of the twist. This is due to the fact that present twists are formed by twisting a straight tube within its elastic limits so that it tends to return to its original shape. The reason it is not twisted beyond its elastic limit and thereby set in shape is that such twisting cannot be effected without distorting the uniform cross-section desired.

It is therefore an object of this invention to provide a twist having and maintaining a uniform cross-section and adapted to maintain such a twist, for tubes or pipes generally, but particularly for pneumatic tube systems.

It is another object of this invention to provide a method for making a twist which will not tend to unwind.

A feature of this invention is the provision of a method for making a twist by joining half sections of preformed mating tube sections having desired angles of twist. Since the sections are preformed they do not tend to release or unwind as they are formed in the shape of a twist initially.

Another feature of this invention is the provision of a twist composed of preformed mating halves.

The above-mentioned and other features and objects of my invention will become more apparent by reference to the following description taken in conjunction with the accompanying drawing, in which:

FIGURE 1 is a side-elevational view of a twist in accordance with my invention;

FIGURE 2 is a plan view of the twist of FIGURE 1;

FIGURE 3 is a cross-sectional view of the twist shown in FIGURE 1 less the connecting structure 10 shown at the right end of the twist and taken along the lines 3—3;

FIGURE 4 is a cross-sectional view of a portion of the tube of FIGURE 2 taken along the lines 4—4;

FIGURE 5 is a cross-sectional view of a portion of the connecting structure at one end of the twist of FIGURE 1;

FIGURE 6 is a partial longitudinal cross-sectional view illustrating the cooperation between the connecting structure of a twist and a joining tube section or member; and FIGURE 7 is a partial longitudinal cross-sectional view of a joining member and two connected twists.

Referring now to FIGURES 1, 2, and 3, wherein a twist in accordance with my invention is illustrated. The twist 1 comprises two mating halves 2 and 3 which are joined along the flanges 4, 5 and 6, 7 of halves 2 and 3 respectively. The half-sections illustrated are almost identical and can be made from the same die, the only difference in treatment being that one flange of each mating pair of flanges must be cut shorter than the other of the pair in the embodiment shown (see FIGURE 4). The joining sections need not be identical as long as they are made to mate and form a twist having a uniform cross-section. The minor axis of the oval cross-section is perpendicular at the center 8 of the tube as shown in FIGURE 1. Looking from the middle of the twist towards each of the ends, the cross-section configuration is rotated clockwise from the center 8 to the left as shown in FIGURE 1 and clockwise from the center 8 to the right as shown in FIGURE 1.

In the twist shown, the cross-section is rotated 22½° from end to end. Therefore, four sections must be joined in order to effect a 90° turn with these twist sections. Since the twist can comprise identical mating pairs having, if desired, identical flanges, the four sections could all be made using one die. Connecting portions 9 and 10 are provided for joining twists to one another and to the pneumatic forwarding tube in which they are to be employed. The cross-section of the twist is radially displaced throughout the length of the twist including connecting portions 9 and 10. However, if desired the connecting portions can comprise untwisted lengths of tubing.

Referring now to FIGURE 4, there is shown a detailed view illustrating a typical assembly of the half-sections of a twist in accordance with my invention. Flanges 5 and 7 of the mating halves 2 and 3 respectively, are spot welded along their common seam 11. The overlapping lip 12 of flange 5 cooperates with flange 7 to form a valley 13 which is filled with solder 14 along the entire length of the tube to provide an airtight seam.

FIGURE 5 illustrates a connecting member or portion which may be used in a twist in accordance with my invention. It is to be noted that the diameter of the body 15 of the twist is slightly greater than the diameter of the transition section 16 to provide a safety margin for preventing the sticking of carriers in the twist itself. The diameter of the transition section 16 is equal to the diameter of the forwarding tube employing the twist. A sufficient safety factor is provided in a 4" x 7" oval-shaped tube if the oval cross-section of the body of the twist is increased approximately one-sixteenth of an inch along its major and minor axes. The diameter of the wall of the tube decreases from the body 15 of the twist toward the diameter of the forwarding tube 16 by means of the hill 17 which has rounded shoulders 18 and 19 to insure a smooth transition. A V-shaped annular recess 20 is provided for connecting the twist to either a joining member or to the forwarding tube. The end portion 21 has a diameter which is greater than the diameter of the body 15 of the twist.

As can be seen in FIGURE 6, the difference between the radius of transition section 16, which equals the radius of the forwarding tube or joining member 22 to which it is to be joined, and the radius of the end portion 21 is equal to the thickness of the joined tubing (joining member 22 in FIGURE 6). Carriers passing between joined members move smoothly from the twist to the joining member or forwarding tube and vice versa as the diameters are equal. The transition section 16 cooperates with hill 17 (FIGURE 5) and the rounded shoulders 18 and 19 to insure a smooth transition between the enlarged body 15 of the twist and the joining member 22. The twist 1 and joining member 22 can be spot welded along their common seam 23 for added strength. Solder 24 is soldered along the entire end of seam 23 to vacuum seal the tube.

Referring now to FIGURE 7, a cross-sectional view of a joining member 25 joining two twists 26, 27 is shown. The joining member 25 is roughly an oval cylinder adapted to register with the connecting portions of the twists and has annular projections 30 and 31 at the ends thereof. The annular projections 30, 31 of joining member 25 connect twists 26 and 27 by means of cooperating annular ridges 28 and 29, respectively. For added strength, the sections may be spot welded along the seams 32, 33. The valley 34 formed between the joining member and the two twists is filled with solder 35 throughout its length to provide an air-tight seal.

As can be seen from the cross-sectional view of FIGURE 7, the joining member 25 must be positioned between the two half-sections of each twist before these halves are joined together. Other methods of joining twists which will not require the insertion of the joining member before the formation of the twist may be used. For example, a straight section of tubing may be inserted into the ends of a twist.

The first step in a method of manufacturing a twist in accordance with my invention requires the provision of preformed mating pairs. The preferred method for forming the mating pairs is by drawing them over a specially prepared die. As an aid in preparing the die it has been found to be helpful to first form a template of one-half of the cross-section of the tube to be formed. As the die is formed, the template is utilized to check for a true cross-section. The template is initially placed at a right angle with respect to the longitudinal axis of the die and is then moved along the axis of the die while being rotated at a uniform rate about the axis of the die as it is moved along the die. After the die has been roughly formed, a template may be moved along its interior surface to check for uniformity. Both sections may be made from the same die, the only difference being that the flanges of one-half must be cut shorter than the flanges of its mating half so that the lip of the flange is eliminated from one of the half-sections. Of course, straight flanges may be used so that the finished halves will be identical, but the other form generally makes for easier soldering.

The mating parts can be cast directly in an aluminum or other castable metals. The cast parts can be assembled by means of bolts and a mastic seal. High temperature welding methods may also be employed to assemble the parts such as Heliarc or gas welding techniques. Soldering of the cast parts would be very difficult as is always true of soldering a casting.

After the half members are formed they are positioned to form a tube and spot welded along the seams. Various finishing steps may be performed before or after forming the tube. After the tube is joined, the connecting seams are soldered to insure an air-tight seal. Conventional means may be used to test the sufficiency of the seal.

When a joining member, as is shown in FIGURE 7, is to be connected to a twist having an annular ridge, the joining member must be disposed between the cooperating halves of the twist before the twist is formed. Two or more twists may be joined in this fashion. Alternatively, a joining member having an annular ridge at only one end may be joined to a twist by means of the annular projection so that the twist may be easily inserted into a pneumatic tube system by means of the straight portion of the joining member. Twists may also be provided without the joining members (note FIGURE 3) and may be easily interconnected by straight lengths of tubing.

Basically the method of making a twist in accordance with one aspect of my invention includes the steps of forming mating portions of a twist and joining the mating portions. Other steps known in this art and directed to vacuum sealing twists which are to be used in pneumatic tube system and forming connecting portions may be included for making the specific types of twists which are desired.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A tube, for use in a pneumatic tube system, comprising two trough-shaped mating members having a uniform and substantially semi-elliptical cross-section, each cross-section being rotated at a uniform rate about the longitudinal axis of the member, such that the seam between the two mating members is displaced to the same extent as the cross-section, and means for vacuum sealing said tube.

2. A tube, according to claim 1, wherein said members form a main body and two connecting portions on the ends of said formed main body.

3. A tube, according to claim 2, wherein the diameter of said main body is greater than the diameter of a forwarding tube of the pneumatic systems of which the tube forms a part, and further comprising transition means for causing the movement of a carrier of said system from said main body to said connecting portions to be smooth.

References Cited

UNITED STATES PATENTS

| 407,356 | 7/1889 | Kittredge | 138—157 X |
| 411,864 | 10/1889 | Leacraft | 138—39 X |
| 2,176,439 | 10/1939 | Taylor | 138—159 X |
| 2,636,083 | 4/1953 | Phillips | 138—122 |

FOREIGN PATENTS

| 23,167 | 1896 | Great Britain. |

LAVERNE D. GEIGER, *Primary Examiner.*

C. HOUCK, *Assistant Examiner.*